(12) United States Patent
Uramoto

(10) Patent No.: US 9,880,612 B2
(45) Date of Patent: Jan. 30, 2018

(54) EXECUTION CONTROL METHOD AND EXECUTION CONTROL APPARATUS

(71) Applicant: FUJITSU LIMITED, Kawasaki-shi, Kanagawa (JP)

(72) Inventor: Takamasa Uramoto, Numazu (JP)

(73) Assignee: FUJITSU LIMITED, Kawasaki (JP)

( * ) Notice: Subject to any disclaimer, the term of this patent is extended or adjusted under 35 U.S.C. 154(b) by 269 days.

(21) Appl. No.: 14/643,471

(22) Filed: Mar. 10, 2015

(65) Prior Publication Data

US 2015/0278089 A1    Oct. 1, 2015

(30) Foreign Application Priority Data

Mar. 27, 2014 (JP) ................................ 2014-066051

(51) Int. Cl.
*G06F 3/00* (2006.01)
*G06F 9/44* (2006.01)

(52) U.S. Cl.
CPC .................. *G06F 3/00* (2013.01); *G06F 8/00* (2013.01); *G06F 9/4443* (2013.01); *G06F 9/4448* (2013.01)

(58) Field of Classification Search
CPC ................ G06F 3/00; G06F 9/00; G06K 9/18
See application file for complete search history.

(56) References Cited

U.S. PATENT DOCUMENTS

| | | | | |
|---|---|---|---|---|
| 7,603,488 B1* | 10/2009 | Gravenstein | ........ | G06F 12/0223 710/20 |
| 2004/0001010 A1* | 1/2004 | Shaylor | ................. | G06F 9/4428 341/50 |
| 2004/0268256 A1* | 12/2004 | Furuta | ................. | G06F 17/2223 715/262 |
| 2005/0231397 A1 | 10/2005 | Koseki et al. | | |
| 2006/0080520 A1* | 4/2006 | Dickenson | .......... | G06F 11/0715 711/170 |
| 2008/0036629 A1* | 2/2008 | Dawra | ................ | G06F 17/3092 341/50 |
| 2014/0283088 A1* | 9/2014 | AlHarbi | .................. | G06F 21/64 726/26 |
| 2015/0055868 A1* | 2/2015 | Takatsuka | ........... | G06F 17/2223 382/185 |

FOREIGN PATENT DOCUMENTS

| | | |
|---|---|---|
| JP | 11-184710 | 7/1999 |
| JP | 2005-293386 | 10/2005 |

* cited by examiner

*Primary Examiner* — Ryan Bertram
(74) *Attorney, Agent, or Firm* — Fujitsu Patent Center

(57) ABSTRACT

An execution control apparatus detects a character process of a character variable included in a program. The character variable allocates a first memory region capable of storing a character code of a specific length to each of one, two, or more characters. When detecting a character process of a character variable, the execution control apparatus allocates a second memory region corresponding to the first memory region to each character. The execution control apparatus processes a character expressed by a second character code that is longer than the specific length, using the first and second memory regions.

5 Claims, 13 Drawing Sheets

FIG. 4A

COBOL PROGRAM 31

```
01  BUF PIC X(3).
01  SECOND-CHAR PIC X.
.....
    MOVE BUF(2:1) TO SECOND-CHAR.
```

FIG. 4B

C PROGRAM 32

```
char buf[3];
char secondChar;
.....
secondChar = buf[1];
```

COMPILER METHOD

INTERPRETER METHOD

REGION MANAGEMENT TABLE                                                136

| USER-DEFINED REGION | | | ALLOCATION FLAG | HIDDEN REGION | |
|---|---|---|---|---|---|
| START ADDRESS | END ADDRESS | UNIT TYPE | | START ADDRESS | NUMBER OF UNITS |
| 0x01...30 | 0x01...3F | 1 byte | True | 0x20...30 | 3 |
| 0x01...A0 | 0x01...BF | 2 byte | True | 0x20...60 | 1 |

FIG. 9

EXECUTION CONTROL METHOD AND EXECUTION CONTROL APPARATUS

CROSS-REFERENCE TO RELATED APPLICATION

This application is based upon and claims the benefit of priority of the prior Japanese Patent Application No. 2014-066051, filed on Mar. 27, 2014, the entire contents of which are incorporated herein by reference.

FIELD

The embodiments discussed herein relate to an execution control method and an execution control apparatus.

BACKGROUND

Some programs cause a computer to process characters. For example, some programs for supporting clerical work read character data from a database to insert and print characters indicated by the character data on a formatted document at predetermined positions.

When characters are handled in a computer, each character is encoded in accordance with a certain character encoding scheme. Various character encoding schemes, such as ASCII (American Standard Code for Information Interchange), UTF (UCS (Universal Coded Character Set) Transformation Format)-8, UTF-16, UTF-32, Shift_JIS (Japanese Industrial Standards), have been proposed. In some different character encoding schemes, different character codes correspond to a same character.

The length (for example, the number of bytes) of a character code is different depending on character encoding scheme and, even in a same character encoding scheme, different depending on character. For example, UTF-8 expresses principal Latin characters with one byte and many Kanji characters with three to four bytes. UTF-32 expresses each character with four bytes. Shift_JIS expresses principal Latin characters with one byte and Kanji characters with two bytes. In recent years, large-scale character encoding schemes, which express various characters in the world using long (for example, a large number of bytes of) character codes, are proposed to increase the maximum length of character codes.

There is a proposal of a compiler that converts character codes by generating a program that reads data including character codes of UTF-8 and processes the data utilizing an application programming interface (API) for handling character codes of UTF-16. The compiler detects a command that reads out characters stored in a character variable in order to insert, before the command, another command that transcodes the character variable by converting its character code from UTF-8 to UTF-16.

Also, with respect to allocation of memory regions used by a program, there is a proposal of a compiler that generates a program that calls a function for receiving data of a part of a certain array (sub-array) as an argument. This compiler determines whether the sub-array data is stored in a continuous region in a memory. When the sub-array data is in a continuous region, the compiler generates a program that refers the function to original data directly. On the other hand, when the sub-array data is in discontinuous regions, the compiler generates a program that copies sub-array data in the memory to pass it to the function.

See, for example, Japanese Laid-open Patent Publication Nos. 2005-293386 and 11-184710.

In the meantime, in some situations, after a program that processes characters expressed by a certain character encoding scheme is created, one may wish to use the program to process characters expressed by another character encoding scheme. For example, when a program used for business operation in a certain country is created and thereafter the business operation is extended to another country of a different language, one may wish to use the program in the other country as well.

If the maximum length of character codes in the other character encoding scheme is longer than that in the original character encoding scheme which was estimated at the time of programming, characters expressed by the other character encoding scheme are not processed properly unless modified. For example, if a program including a character variable that allocates a two-byte memory region to each character processes a character expressed with four bytes, its character code overflows the memory region.

On the other hand, modifying a program to enable it to handle a longer character code than was estimated at the time of programming will have a large influence on a wide range of the program, necessitating enormous workload. For example, if the data size of a certain character variable is made larger, descriptions of various processes referring to the variable are also to be modified. Also, if its data structure is changed, a process procedure (algorithm) dependent on the data structure is also to be modified.

SUMMARY

According to an aspect, there is provided an execution control method including: detecting, by a processor, a character process of a character variable included in a program, wherein the character variable allocates a first memory region capable of storing a first character code of a specific length in a memory to each of one, two, or more characters; allocating, by the processor, a second memory region corresponding to the first memory region to each of the characters when detecting the character process of the character variable; and processing, by the processor, a character expressed by a second character code that is longer than the specific length, using the first and second memory regions.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 4A and 4B illustrate examples of a user program;

FIG. 9 illustrates an example of a region management table;

DESCRIPTION OF EMBODIMENTS

Figure 1:
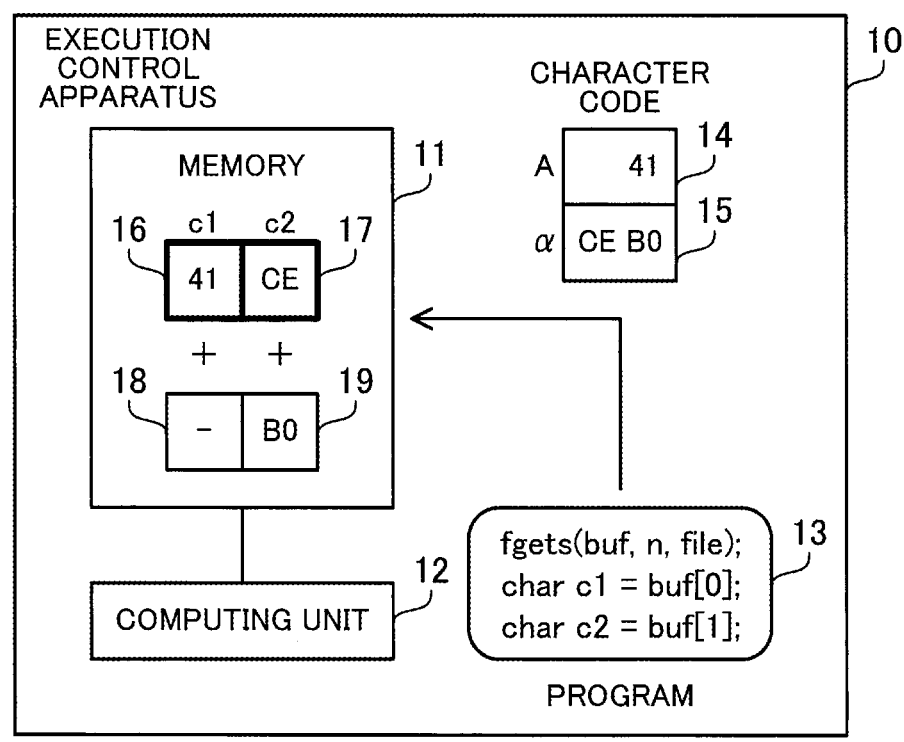
FIG. 1 illustrates an execution control apparatus of a first embodiment.

Several embodiments will be described below with reference to the accompanying drawings, wherein like reference numerals refer to like elements throughout.

First Embodiment

FIG. 1 illustrates an execution control apparatus of the first embodiment. The execution control apparatus 10 of the first embodiment controls execution of a program 13. The execution control apparatus 10 may be a computer that runs the program 13. Also, the execution control described below may be implemented by software, such as a runtime library utilized from the program 13 and an interpreter for interpreting the program 13. The program 13 may be a source program described in a high-level language or a machine-readable object program described in a machine language.

The execution control apparatus 10 includes a memory 11 and a computing unit 12. The memory 11 is, for example, a volatile semiconductor memory, such as a RAM (Random Access Memory). The computing unit 12 is, for example, a processor. The processor may be a CPU (Central Processing Unit), a DSP (Digital Signal Processor), or an integrated circuit for a specific purpose, such as an ASIC (Application Specific Integrated Circuit) and an FPGA (Field Programmable Gate Array). The processor may execute a program stored in a storage device (for example, the memory 11), such as a RAM. Also, an aggregation of two or more processors (multiprocessor) may be called "processor".

When the program 13 is executed, regions for character variables are allocated in the memory 11. The program 13 is described using character variables which each allocate a first memory region capable of storing a character code of a certain length (for example, one byte or two bytes) to each of one, two, or more characters. For example, the program 13 defines character variables c1 and c2 which each represent one character expressed by a one-byte character code. In this case, a one-byte region 16 for the character variable c1 and a one-byte region 17 for the character variable c2 are allocated in the memory 11 in accordance with the description of the program 13.

Also, in addition to the first memory region commensurate with the length of a character code defined in the program 13, a second memory region corresponding to the first memory region is allocated in the memory 11 to each of one, two, or more characters. For example, in the memory 11, a region 18 is allocated corresponding to the region 16 with respect to the character variable c1, and a region 19 is allocated corresponding to the region 17 with respect to the character variable c2. The size of the regions 18 and 19 is, for example, same as or an integral multiple of the size of the regions 16 and 17. The regions 18 and 19 are not allocated in response to a request of the program 13 and thus are not recognized from the program 13. Therefore, the regions 18 and 19 can be called "hidden region".

The computing unit 12 detects a character process of a character variable in the program 13. The character process of a character variable is a process defined using a character variable, such as storing a character into a character variable, reading a character from a character variable, copying and moving a character between character variables, and comparing characters between two character variables. When detecting a process of a character variable, the computing unit 12 allocates a second memory region in the memory 11, if the second memory region (for example, the regions 18 and 19) is not yet allocated in the memory 11, corresponding to the first memory region (for example, the regions 16 and 17) for the character variable. Then, the computing unit 12 processes each of one, two, or more characters, using the regions allocated in the memory 11. Here, the computing unit 12 processes a character expressed in another character code and thus having a longer length (for example, three or four bytes) than the program 13 originally estimated, utilizing both of the first memory region allocated in response to a request of the program 13 and the second memory region corresponding to the first memory region.

For example, when the program 13 is executed, the execution control apparatus 10 reads a character string described in UTF-8. UTF-8 is a character encoding scheme in which the length of a character code varies from one to four bytes (or one to six bytes) depending on character. For example, a one-byte character code 14 indicating character "A" ("41" in hexadecimal numbering system) is read for the character variable c1, and a two-bytes character code 15 indicating character "α" ("CEB0" in hexadecimal numbering system) is read for the character variable c2. Then, the computing unit 12 stores the bit string "41" in the region 16 with respect to the character "A". Since the length of the character code 14 is one byte which is identical with the size of the region 16 allocated for the character variable c1, the computing unit 12 is needless to use the region 18. On the other hand, the computing unit 12 stores a bit string "CE" in the region 17 and a bit string "B0" in the region 19 with respect to the character "α". Since the length of the character code 15 is two bytes which is larger than the size of the region 17 allocated for the character variable c2, the computing unit 12 uses the region 19.

As described above, even when the program 13 is described with an assumption that each character is expressed with one byte, the regions 18 and 19 allocated in the memory 11 are utilized to properly process characters expressed with two bytes or more. Here, the program 13 is needless to recognize presence of the regions 18 and 19 and is needless to be modified to process a character expressed with two bytes or more.

Following description will explain an example of execution control in which the program 13 is a compiled object code, and processing of the computing unit 12 is implemented using a runtime library.

When compiling the program 13, the compiler detects a predetermined character variable (for example, char type of C language, X type of COBOL language, etc.). The number of bytes used to express one character is predetermined according to character type. Then, in the same way as normal compiling, the compiler includes, in an object code, a command for allocating a first memory region of predetermined bytes in the memory 11. In some cases, a first memory region is statically allocated when the program 13 starts. In other cases, the program 13 itself dynamically allocates a first memory region from a heap region in the middle of process. Also, in other cases, a first memory region is dynamically allocated by a runtime library. In that case, the compiler includes, in the program 13, a command for requesting a runtime library to allocate a first memory region.

Also, the compiler detects a description in the program 13 for processing a character variable, such as a description for assigning a character to a character variable and a description for referring to a character assigned to a character variable. In conventional compiling, the compiler includes a command for accessing a first memory region (a command for writing a character code in a first memory region or a command for reading a character code from a first memory region) in an object code. On the other hand, when the execution control of the first embodiment is implemented, the compiler includes a command for calling a runtime library in an object code, instead of a command for accessing a first memory region.

For example, when the program 13 calls a runtime library, the program 13 notifies the runtime library of an address of the first memory region that is to be accessed (for example, a start address and an end address thereof). Also, the program 13 notifies the runtime library of the character type of the variable corresponding to the first memory region that is to be accessed or of the number of bytes per one character in the first memory region. Note that the runtime library may refer to information of the number of bytes per one character in an object code.

When a program 13 compiled in this way is executed, a runtime library might not be called, and thus a second memory region corresponding to the first memory region is not yet allocated, even though a first memory region is allocated in the memory 11. On the other hand, when the program 13 accesses a first memory region, a runtime library is called. When a second memory region corresponding to the first memory region whose information is sent from the program 13 is not yet allocated in the memory 11, the runtime library allocates a second memory region. The second memory region is a region that is not explicitly requested from the program 13 and is not recognized from the program 13.

Then, the runtime library processes a character expressed by a character code that is longer than the number of bytes determined according to character type, using a first memory region and a second memory region, in response to a call from the program 13. For example, the runtime library writes a bit string of a part of a character code in a first memory region and a bit string of the remaining part of the character code in a second memory region with respect to each character. Also, for example, the runtime library combines a bit string stored in a first memory region and a bit string stored in a second memory region in order to reproduce a character code with respect to each character.

According to the execution control apparatus 10 of the first embodiment, a second memory region is allocated in the memory 11, corresponding to a first memory region allocated in the memory 11 for a character variable, with respect to each of one, two, or more characters. Then, when a character process of the character variable is executed, a character expressed by a long character code is processed, using the first memory region and the second memory region. Thereby, after creating the program 13 that processes characters expressed by a certain character encoding scheme, one can use the program 13 to process characters expressed by other character encoding schemes including longer character codes. Here, modification for adapting the program 13 to another character encoding scheme is reduced.

Modifying a program to process a longer character code generates a following problem. In one method, one can conceive of changing a variable type to the one having a larger size. For example, in C language, char type indicating a one-byte character may be changed to wchar type indicating a two-byte character. In COBOL language, X type indicating a one-byte character may be changed to N type indicating a two-byte character.

However, when the type of a certain variable is changed, a description in a program referring to the variable might be modified as well, resulting in an increased modification amount. Also, when a modified variable belongs to a data structure including a plurality of data items (for example, structure of C language, group item of COBOL language, etc.), layout change might affect a wide range. For example, when a variable having a larger size belongs to a structure, and another variable is defined after the variable, an offset from the beginning of the structure to the other variable is changed, which forces descriptions in the program referring to the other variable to be modified as well.

Also, as one method, one can conceive of allowing a plurality of units to express one character, violating the assumption that a unit data amount (character unit) determined according to a variable type contains a character code corresponding to one character (the rule of "one unit for one character"). For example, an array variable of six units is defined using char type in which a character unit is one byte, and three two-byte characters are stored in the array variable. However, when the rule of "one unit for one character" is violated, a process for determining boundaries between characters is to be explicitly described in a program, necessitating change of an algorithm for referring to array variables.

As described above, when a program is modified to process a longer character code, its influence might extend widely, increasing burden of modification work. In contrast, the execution control apparatus 10 is used to reduce modification of a program and to facilitate processing of characters of other character encoding schemes by the program.

Second Embodiment

Figure 2:
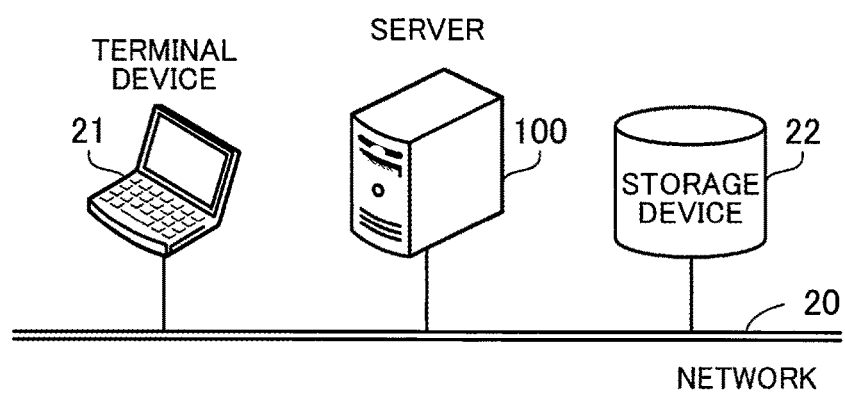
FIG. 2 illustrates an information processing system of a second embodiment.

FIG. 2 illustrates an information processing system of the second embodiment. The information processing system of the second embodiment includes a terminal device 21, a storage device 22, and a server 100. The terminal device 21 and the server 100 are capable of communicating with each other via a network 20. The server 100 and the storage device 22 are capable of communicating with each other via the network 20.

The terminal device 21 is a client computer that a user operates in business task. The terminal device 21 is operable to transmit, to the server 100, character data indicating characters or the like that is input by a user. Also, the terminal device 21 is operable to receive character data from the server 100 and display characters indicated by the received character data on a display of the terminal device 21.

The storage device 22 includes a non-volatile storage device for storing data, such as an HDD (Hard Disk Drive). The storage device 22 may be a computer (file server) that manages data as a file or a computer (database server) that manages data as a database. The storage device 22 is operable to receive character data from the server 100 and write the received character data in the non-volatile storage device.

The server 100 is a server computer that executes business application programs. Some programs executed in the server 100 process character strings. The server 100 is operable to receive character data from the terminal device 21. Also, the server 100 is operable to read character data from a non-volatile storage device included in the server 100 or the storage device 22. Also, the server 100 is operable to transmit character data to the terminal device 21. Also, the server 100 is operable to output character data to an output device, such as a printer, connected to the server 100.

The server 100 can execute a plurality of types of programs described in different programming languages. For example, the server 100 executes a program created in COBOL language and a program created in C language. As for programs of different types, one program sometimes calls another program on the basis of interface definitions (for example, definition of a function or a data structure) disclosed by the other program.

Figure 3:
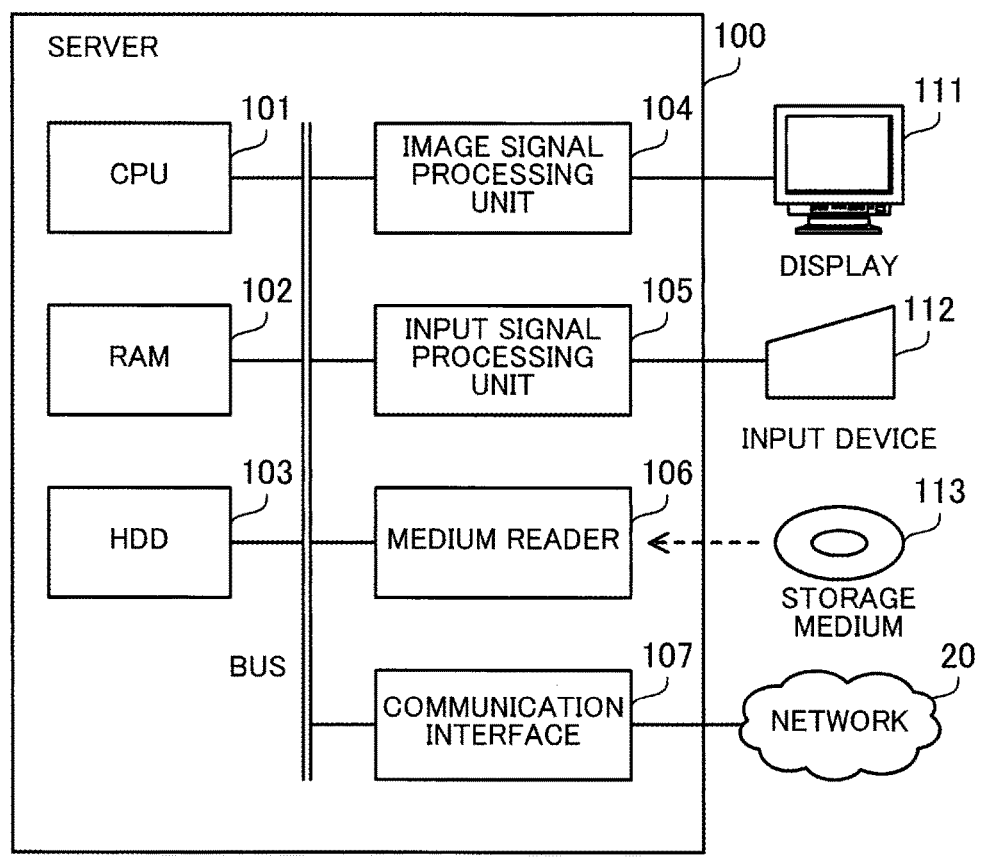
FIG. 3 is a block diagram of exemplary hardware of a server.

FIG. 3 is a block diagram of exemplary hardware of the server. The server 100 includes a CPU 101, a RAM 102, an HDD 103, an image signal processing unit 104, an input signal processing unit 105, a medium reader 106, and a communication interface 107. These units are connected to a bus. The CPU 101 is an example of the computing unit 12 of the first embodiment, and the RAM 102 is an example of the memory 11 of the first embodiment.

The CPU 101 is a processor including a computing circuit that executes commands of programs. The CPU 101 loads at least a part of programs and data stored in the HDD 103 into the RAM 102, in order to execute the programs. Note that the CPU 101 may include a plurality of processor cores, and the server 100 may include a plurality of processors. Processes described below may be executed in parallel using processors or processor cores. Also, an aggregation of processors (multiprocessor) may be called "processor".

The RAM 102 is a volatile semiconductor memory that temporarily stores programs executed by the CPU 101 and data that the CPU 101 uses in calculation. Note that the server 100 may include a memory of a type other than RAM. Also the server may include a plurality of memories.

The HDD 103 is a non-volatile storage device for storing programs and data of an operating system (OS), middleware, and software such as application software. Note that the server 100 may include a storage device of another type, such as a flash memory and an SSD (Solid State Drive). Also, the server 100 may include a plurality of non-volatile storage devices.

The image signal processing unit 104 outputs an image to a display 111 connected to the server 100, in accordance with a command from the CPU 101. The display 111 is, for example, a CRT (Cathode Ray Tube) display, a liquid crystal display (LCD), an plasma display panel (PDP), and an organic electro-luminescence (OEL) display.

The input signal processing unit 105 acquires an input signal from an input device 112 connected to the server 100, and outputs it to the CPU 101. The input device 112 is, for example, a pointing device such as a mouse, a touch panel, a touch pad, and a trackball, as well as a keyboard, a remote controller, and a button switch. Also, a plurality of types of input devices may be connected to the server 100.

The medium reader 106 is a reader device for reading programs and data stored in a storage medium 113. The storage medium 113 is, for example, a magnetic disk such as a flexible disk (FD) and an HDD, an optical disc such as a CD (Compact Disc) and a DVD (Digital Versatile Disc), a magneto-optical disk (MO), and a semiconductor memory.

The medium reader 106 stores programs and data read from the storage medium 113 in the RAM 102 or the HDD 103, for example.

The communication interface 107 is an interface that is connected to the network 20 to communicate with the terminal device 21 and the storage device 22 via the network 20. The communication interface 107 may be a wired communication interface connected to a communication device via a cable or a wireless communication interface connected to a base station via a wireless link.

Note that the server 100 may be configured without the medium reader 106. Also, the server 100 may be configured without the image signal processing unit 104 and the input signal processing unit 105 when controllable from a terminal device operated by a user. Also, the display 111 and the input device 112 may be formed integrally with the housing of the server 100. The terminal device 21 and the storage device 22 may be configured using a same type of hardware as the server 100.

FIGS. 4A and 4B illustrate examples of a user program. Here, a COBOL program 31 and a C program 32 are taken as examples of a user program that a user creates and stores in the server 100.

The COBOL program 31 defines an array variable BUF of a character type (X type) in which one unit is one byte and having a length of three, as well as a variable SECOND-CHAR of X type. Subsequently, the COBOL program 31 reads a character code of three characters into the array variable BUF and copies the character code of the second character to the variable SECOND-CHAR. This COBOL program 31 employs the character encoding scheme of "one byte for one character".

The C program 32 also executes the same processes as the COBOL program 31. The C program 32 defines an array variable buf of a character type (char type) in which one unit is one byte and having a length of three, as well as a variable secondChar of char type. Subsequently, the C program 31 reads a character code of three characters into the array variable buf and copies the second character of the character code to the variable secondChar. Likewise the COBOL program 31, this C program 32 employs the character encoding scheme of "one byte for one character".

In some cases, one may wish to process character data of another character encoding scheme in which the maximum length of character code is longer, using the COBOL program 31 and the C program 32 without modifying them. Thus, in the second embodiment, when executing a user program, the server 100 controls character processing to handle a character code of a larger number of bytes. In the following, the user program is mainly the COBOL program 31.

Figure 5A:
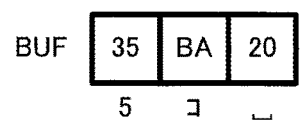
FIGS. 5A, 5B, and 5C illustrate a problem occurring when a character encoding scheme is changed.
Figure 5B:
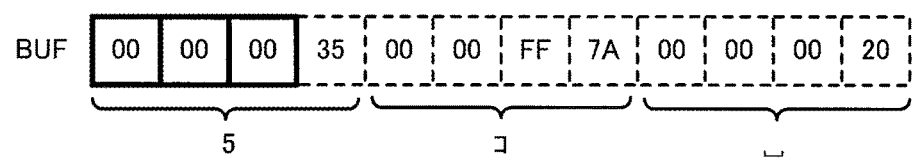
Figure 5C:
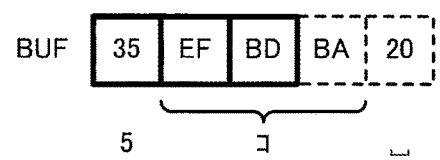

FIGS. 5A, 5B, and 5C illustrate a problem occurring when a character encoding scheme is changed. Here, the character code of a character string "5з" (the third character is a space) is read. When Shift_JIS is employed as the character encoding scheme, these three characters are each expressed with one byte, and the character string is expressed as "35BA20" in hexadecimal numbering system. Therefore, the array variable BUF of the COBOL program 31 can contain the character code.

In contrast, when UTF-32 is employed as the character encoding scheme, each character is expressed with four bytes, and the character string is expressed as "000000350000FF7A00000020" in hexadecimal numbering system. Therefore, the character code overflows the array variable BUF. Also, when UTF-8 is employed as the character encoding scheme, each character is expressed with one of one to four bytes (or, one to six bytes), and the character string is expressed as "35EFBDBA20" in hexadecimal numbering system. Therefore, the character code overflows the array variable BUF.

As described above, when a larger character code than the character unit of array variable BUF and variable SECOND-CHAR is read, overflow occurs, violating the rule of "one unit for one character". This might disable the COBOL program 31 to be executed properly. Thus, as described below, the server 100 prepares a hidden region in the RAM 102, corresponding to a user-defined region defined by a character variable.

Figure 6:
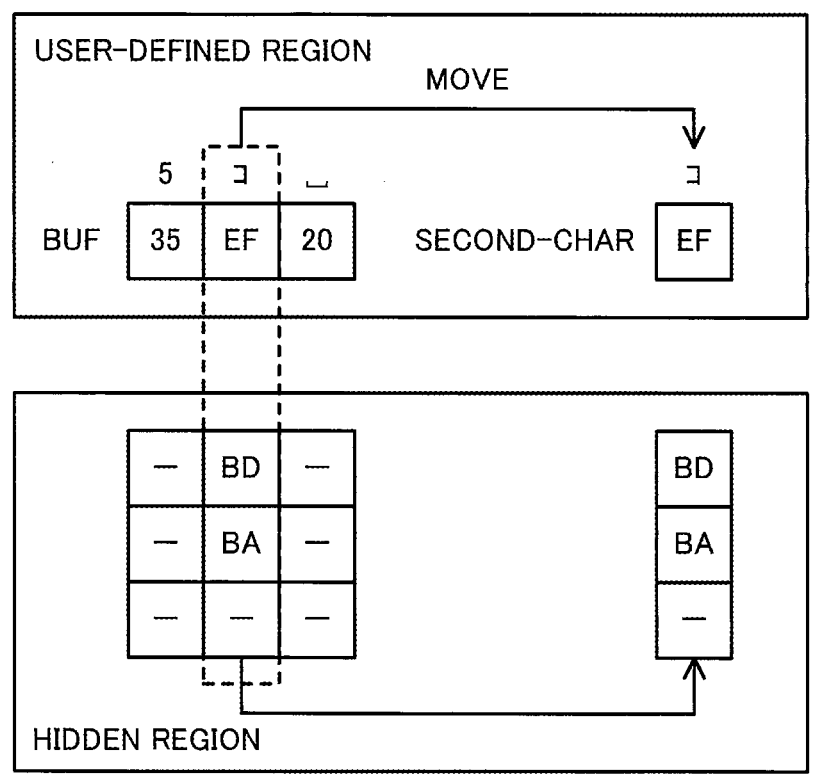
FIG. 6 illustrates exemplary process of storing a character code by means of a hidden region.

FIG. 6 illustrates exemplary process of storing a character code by means of a hidden region. Here, a character code of UTF-8 in which one character is one to four bytes is read. When executed, the COBOL program 31 allocates a user-defined region for the array variable BUF for storing three one-byte characters, as well as a user-defined region for the variable SECOND-CHAR for storing one one-byte character, in the RAM 102.

In addition, the server 100 allocates a hidden region for storing three three-byte characters, corresponding to the user-defined region of the array variable BUF, in the RAM 102. Also, the server 100 allocates a hidden region for storing one three-byte character, corresponding to the user-defined region of the variable SECOND-CHAR. A combination of a user-defined region and a hidden region constitutes a region of four bytes for one character, which is allocated in the RAM 102. This enables the array variable BUF and the variable SECOND-CHAR to contain a character code of UTF-8 of four bytes or less.

The hidden region is a memory region that is not directly recognized from the COBOL program 31 as it is a user program. The COBOL program 31 recognizes that one unit contains a character code of each character in accordance with the rule of "one unit for one character". When the COBOL program 31 is about to execute character handling, such as writing, copying, and comparing of a character code, to a user-defined region, the server 100 handles a bit string stored in a hidden region in the same way as a bit string stored in a user-defined region.

For example, the character code of UTF-8 indicating a character string "5㎝" is stored in the array variable BUF. Since "5 " is expressed by a character code "35" of one byte, the character code is stored in the user-defined region of the first character, and three bytes of the hidden region are vacant. For example, a predetermined bit string indicating an unused state, such as null character, is stored in the unused hidden region. Since " ㎝ " is expressed by a character code "EFBDBA" of three bytes, the starting one byte "EF" is stored in the user-defined region of the second character, and the remaining two bytes "BDBA" is stored in the hidden region of the second character. Since " " (a space) is expressed by a character code "20" of one byte, the character code is stored in the user-defined region of the third character.

Thereafter, for example, in accordance with the COBOL program 31, the character code of the second character of the character string "5㎝" is copied from the array variable BUF to the variable SECOND-CHAR. In this case, the server 100 copies the bit string "EF", which is present in the user-defined region of the array variable BUF, to the user-defined region of the variable SECOND-CHAR. Also, the server 100 copies the bit string "BDBA", which is present in the hidden region of the array variable BUF, to the hidden region of the variable SECOND-CHAR. When comparing the character code stored in the array variable BUF with another character code, the server 100 compares the bit strings which are present in the user-defined regions with each other, and compares the bit strings which are present in the hidden regions with each other, in order to determine whether the character codes are same. As described above, the server 100 handles a long character code by combining a bit string in a user-defined region and a bit string in a hidden region, in order to read and write them.

Figure 7A:
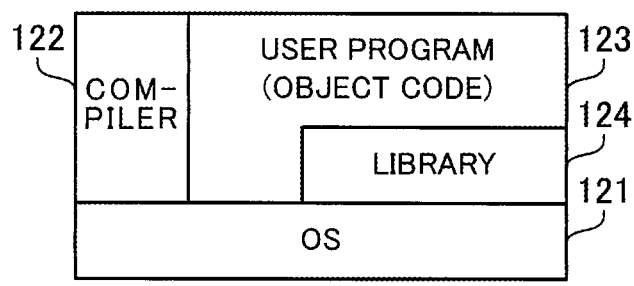
FIGS. 7A and 7B illustrate exemplary software configurations of a server.
Figure 7B:
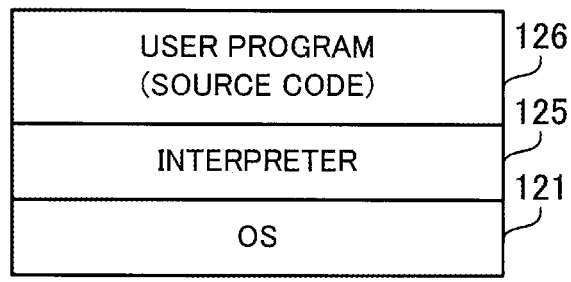

FIGS. 7A and 7B illustrate exemplary software configurations of the server. The server 100 executes a user program, such as the aforementioned COBOL program 31, by means of a compiler or an interpreter.

When using a compiler, the server 100 includes an operating system 121, a compiler 122, a user program 123, and a library 124, as software. The operating system 121 controls execution of middleware and application software. The compiler 122 transforms a source code described in a high-level language to a machine-readable object code. The user program 123 is an object code generated by the compiler 122. The library 124 is a runtime library called from the user program 123 as appropriate when the user program 123 is executed. Note that the user program 123 may be generated in another computer, such as the terminal device 21, and stored in the server 100. In that case, the server 100 may be configured without the compiler 122.

The library 124 may include processes of a character code utilizing the aforementioned hidden region. For example, when compiling a source code, the compiler 122 receives information indicating a character encoding scheme or the maximum length of a character code from a user as a compile option. Then, the compiler 122 embeds information indicating the maximum length of a character code in the user program 123. Also, the compiler 122 detects character variables, such as the aforementioned array variable BUF and variable SECOND-CHAR. As for defining a character variable, the compiler 122 may generate the user program 123 that by itself allocates a user-defined region in the RAM 102 to a character variable, without calling the library 124.

On the other hand, the compiler 122 detects handling of a character variable, such as writing, reading, and comparing of a character code. Then, the compiler 122 generates the user program 123 for calling a function of the library 124, instead of accessing the user-defined region by itself. When calling, the user program 123 notifies the library 124 of an address (for example, a start address and an end address) of a user-defined region that is to be accessed. Also, the user program 123 may notify the library 124 of a character type specified in a source code or the size of one character unit determined according to a character type. Procedures for handling a character variable are defined in functions included in the library 124.

When using an interpreter, the server 100 includes an operating system 121, an interpreter 125, and a user program 126, as software. The interpreter 125 is middleware that sequentially interprets and executes a source code described in a high-level language. The user program 126 is a source code executed on the interpreter 125.

The interpreter 125 includes processes of a character code utilizing the aforementioned hidden region. For example, at a start of the user program 126, the interpreter 125 receives information indicating a character encoding scheme or the maximum length of a character code from a user as an execution-time option. The interpreter 125 detects character variables described in the user program 126. When allocating a user-defined region in the RAM 102 in accordance with the definition of a character variable, the interpreter 125 simultaneously allocates a hidden region in the RAM 102.

Alternatively, the interpreter 125 may allocate a hidden region in the RAM 102, when handling a character variable in accordance with the user program 126. Then, the interpreter 125 processes a character code utilizing a hidden region. Procedures for handling a character variable, such as writing, reading, and comparing of a character code, are defined in advance in the interpreter 125.

Next, functions of the server 100 and processes executed by the server 100 will be described. In the following, a user program is executed by means of a compiler.

Figure 8:
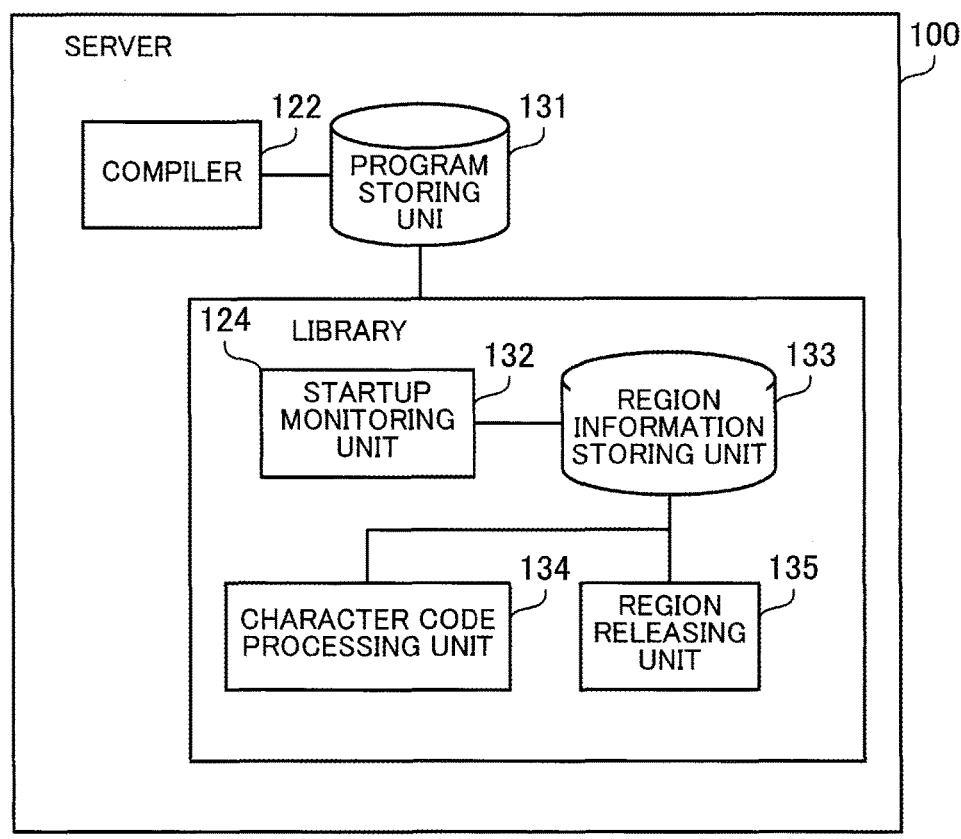
FIG. 8 is a block diagram of exemplary functions of a server.

FIG. 8 is a block diagram of exemplary functions of the server. As described above, the server 100 includes the compiler 122 and the library 124. Also, the server 100 includes a program storing unit 131, a startup monitoring unit 132, a region information storing unit 133, a character code processing unit 134, and a region releasing unit 135. The program storing unit 131 and the region information storing unit 133 are configured as storage regions allocated in the RAM 102 or the HDD 103, for example. The startup monitoring unit 132, the character code processing unit 134, and the region releasing unit 135 are configured as modules included in the library 124.

When compiling a source code, the compiler 122 receives information indicating a character encoding scheme used in character data that is to be read into the server 100 or the maximum length of a character code, from a user as a compile option. The character encoding scheme can be different from the one that a source code employs, and the maximum length of a character code can be longer than the source code estimated originally. Then, the compiler 122 embeds information indicating the maximum length of a character code in an object program. Also, the compiler 122 generates an object code that calls the library 124 in connection with a description in a source code for handling a character variable, such as writing, reading, and comparing of a character code. The compiler 122 stores a generated object code in the program storing unit 131.

Upon startup of a user program as an object code stored in the program storing unit 131, the startup monitoring unit 132 generates a region management table, which is described later, in the region information storing unit 133. The region management table is a table for recording correspondence relationship between user-defined regions and hidden regions which are allocated in the RAM 102 in accordance with a user program. Also, the startup monitoring unit 132 deletes the region management table when a user program ends.

The character code processing unit 134 processes a character code using a user-defined region and a hidden region in response to a call from a user program. When writing a character code in a user-defined region of a certain character variable for the first time, the character code processing unit 134 allocates a hidden region corresponding to the user-defined region in the RAM 102. The size of a hidden region is determined on the basis of information of the maximum length of a character code which is embedded in a user program, so as to contain the character code. Then, the character code processing unit 134 records correspondence relationship between the user-defined region and the hidden region, in a region management table stored in the region information storing unit 133.

When a hidden region is allocated, the character code processing unit 134 writes a bit string of a starting part of a target character code in a user-defined region and writes the remaining bit string, which has overflowed the user-defined region, in the hidden region. When referring to or updating a user-defined region of a certain character variable, the character code processing unit 134 searches the region management table stored in the region information storing unit 133 for a hidden region corresponding to the user-defined region. Then, the character code processing unit 134 executes processing, such as reading, writing, and comparing, of a bit string for each character with respect to both of the user-defined region and the corresponding hidden region.

The region releasing unit 135 is called from a user program, when the user program releases a user-defined region of a certain character variable that is not used any more. Then, the region releasing unit 135 searches the region management table stored in the region information storing unit 133 for a hidden region corresponding to the user-defined region. Then, the region releasing unit 135 releases the user-defined region and the hidden region and deletes information of the hidden region from the region management table.

FIG. 9 illustrates an example of a region management table. A region management table 136 is stored in the region information storing unit 133. The region management table 136 is a collection of information representing a start address of a user-defined region, an end address of a user-defined region, a unit type, an allocation flag, a start address of a hidden region, and a number of units in a hidden region.

A start address of a user-defined region is an address in the RAM 102 indicating the beginning of the user-defined region. An end address of a user-defined region is an address in the RAM 102 indicating the ending of the user-defined region. One user-defined region is allocated in the RAM 102 for one character variable, such as an array variable BUF and a variable SECOND-CHAR, and has a size of n characters multiplied by one unit (wherein n is an integer equal to or greater than one). A unit type indicates the number k of bytes of one unit, which is determined according to a variable type described in a user program. For example, X type of COBOL language is one byte, and N type is two bytes. The above information indicating a user-defined region is given to the character code processing unit 134, when the user program 123, which is about to access a user-defined region, calls the character code processing unit 134, for example.

An allocation flag is a flag indicating whether or not a hidden region has been allocated corresponding to a user-defined region identified by a start address and an end address. A start address of a hidden region is an address in the RAM 102 indicating the beginning of the hidden region. One hidden region is allocated corresponding to one user-defined region and has a size of n characters multiplied by m units (wherein m is an integer equal to or greater than one). In other words, one hidden region corresponds to one character variable. The number of units in a hidden region indicates that m units are allocated for one character. Therefore, a combination of a user-defined region and a hidden region can store a character code in which (m+1) multiplied by k bytes are for one character. The number m of units in a hidden region may be decided on the basis of information indicating the maximum length of a character code described in a user program. For example, the number m is set at the minimum possible value that makes (m+1) multiplied by k equal to or greater than the maximum length of a character code. When one unit of a user-defined region is one byte, and the maximum length of a character code read in the server 100 is four bytes, the number of units of a hidden region is at least three.

Figure 10:
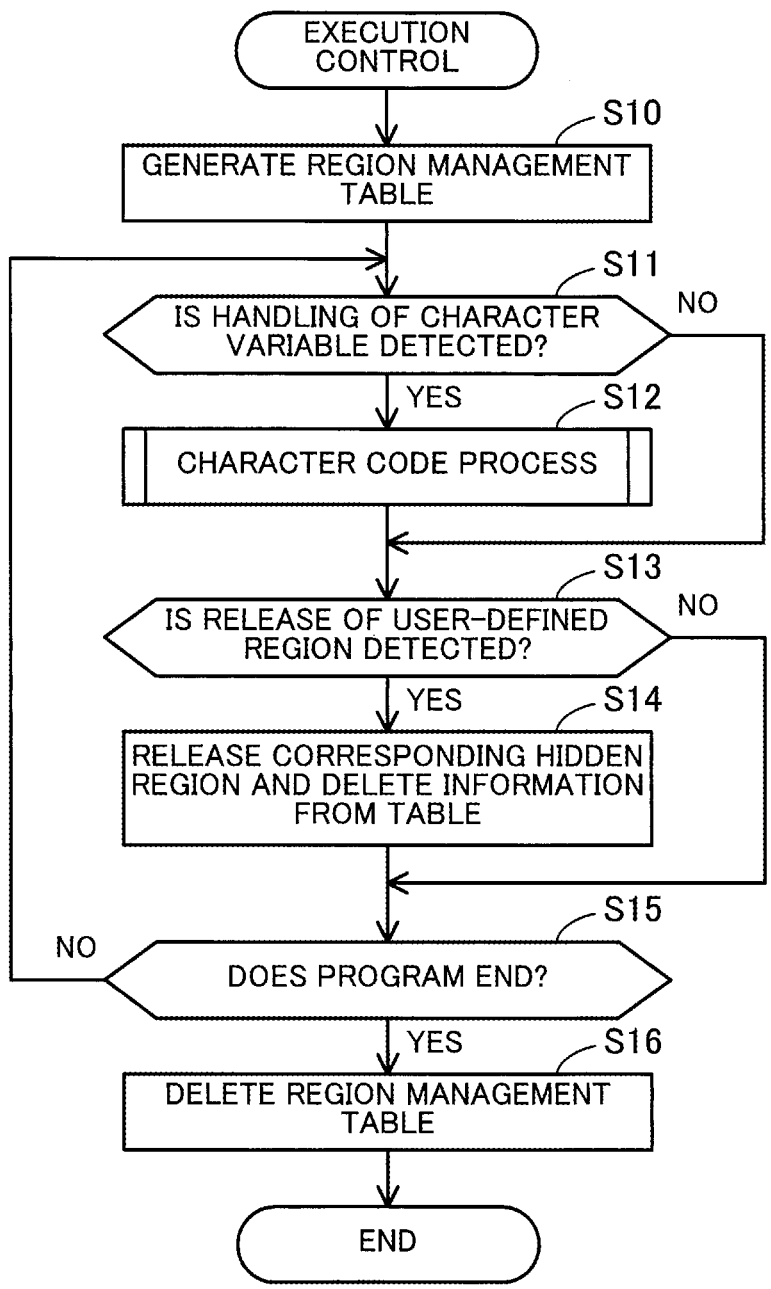
FIG. 10 is a flowchart illustrating an exemplary procedure of an execution control.

FIG. 10 is a flowchart illustrating an exemplary procedure of execution control.

(S10) Upon detecting startup of a user program, the startup monitoring unit 132 generates a vacant region management table 136 and stores it in the region information storing unit 133.

(S11) The character code processing unit 134 determines whether the user program handles a character variable. Handling of a character variable is, for example, writing a character code in a specified user-defined region for a character variable, reading a character code from a specified user-defined region, and comparing character codes. The user program calls the character code processing unit 134, depending on type of handling of a character variable. If handling of a character variable is detected, the process proceeds to step S12. If not, the process proceeds to step S13.

(S12) The character code processing unit 134 processes a character code utilizing a user-defined region and a hidden region. Detail of the character code process will be described later.

(S13) The region releasing unit 135 determines whether the user program releases the user-defined region. When releasing the user-defined region, the user program calls the region releasing unit 135. If release of the user-defined region is detected, the process proceeds to step S14. If not, the process proceeds to step S15.

(S14) The region releasing unit 135 searches the region management table 136 stored in the region information storing unit 133 for a hidden region corresponding to the user-defined region specified by the user program. Then, the region releasing unit 135 releases the user-defined region specified from the user program and the searched hidden region. Also, the region releasing unit 135 deletes information of the user-defined region and the hidden region from the region management table 136.

(S15) The startup monitoring unit 132 determines whether the user program ends. If the user program ends, the process proceeds to step S16. If not, the process proceeds to step S11.

(S16) Upon detecting end of the user program, the startup monitoring unit 132 deletes the region management table 136 stored in the region information storing unit 133.

Figure 11:
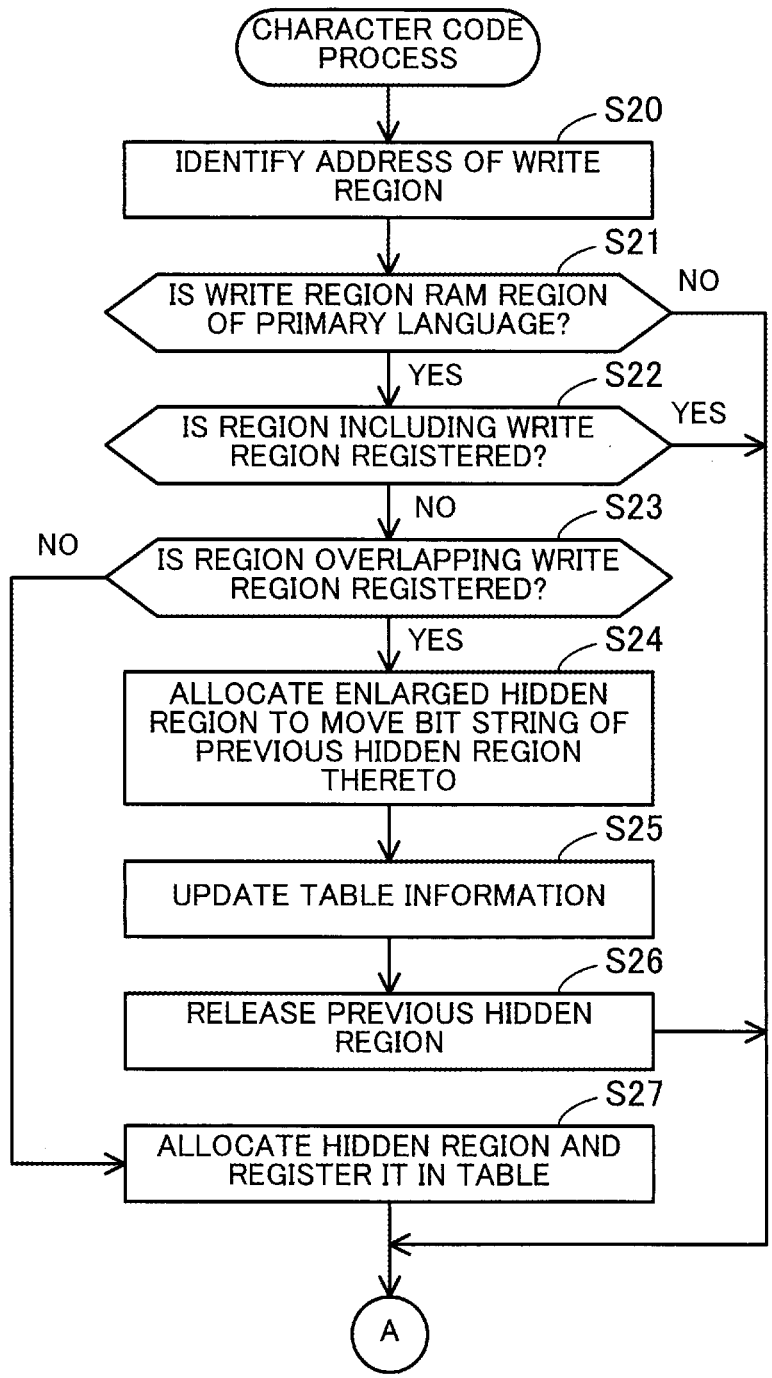
FIG. 11 is a flowchart illustrating an exemplary procedure of a character code process.

FIG. 11 is a flowchart illustrating an exemplary procedure of a character code process. This character code process is executed in aforementioned step S12.

(S20) When the user program requests writing of a character code, the character code processing unit 134 identifies the address of a write region. Note that, when writing of the character code is not requested, steps S20 to S27 are needless to be executed.

(S21) The character code processing unit 134 determines whether the write region is a region in the RAM 102 for a primary language processing system managed by the library 124. For example, when the user program is COBOL program 31, the character code processing unit 134 determines whether the write region is a region in the RAM 102 used by a COBOL language processing system. Write regions other than the region in the RAM 102 for the primary language processing system are, for example, regions in the RAM 102 used by other language processing systems (for example, C language processing system) and external devices such as the HDD 103, the display 111, the terminal device 21, and the storage device 22. If the write region is a region in the RAM 102 for the primary language processing system, the process proceeds to step S22. If not, the process proceeds to step S28.

(S22) The character code processing unit 134 determines whether a user-defined region including the write region is recorded in the region management table 136 stored in the region information storing unit 133. The user-defined region including the write region is a region that includes the entire write region between a start address and an end address of the region. If a user-defined region including the write region is recorded, the hidden region corresponding to the user-defined region is determined to be present already, and the process proceeds to step S28. If not, the process proceeds to step S23.

(S23) The character code processing unit 134 determines whether a user-defined region that does not include the entire write region but partially overlaps the write region is recorded in the region management table 136. A character code is written in the region partially overlapping the recorded user-defined region, for example, when the user program redefines a new user-defined region including the existing user-defined region. If a user-defined region partially overlapping the write region is recorded, the process proceeds to step S24. If not, the process proceeds to step S27.

(S24) The character code processing unit 134 identifies an enlarged user-defined region including the write region and the previous user-defined region recorded in the region management table 136. The character code processing unit 134 allocates an enlarged hidden region corresponding to the enlarged user-defined region in the RAM 102. Then, the character code processing unit 134 searches for the previous hidden region corresponding to the previous user-defined region and moves the bit string stored in the previous hidden region to the enlarged hidden region.

(S25) The character code processing unit 134 deletes information of the previous user-defined region and the previous hidden region from the region management table 136. Also, the character code processing unit 134 records information of the enlarged user-defined region and the enlarged hidden region in the region management table 136.

(S26) The character code processing unit 134 releases the previous hidden region allocated in the RAM 102. Thereby, the hidden region is changed when the user-defined region is changed by the user program. Then, the process proceeds to step S28.

(S27) The character code processing unit 134 allocates a hidden region corresponding to the write region in the RAM 102. Here, the number n of characters of a character string expressed using the hidden region and the number k of bytes of one unit can be identified from information that a user program notifies when calling, descriptions included in a user program, and so on. The number m of units per one character in the hidden region may be decided on the basis of the maximum length of a character code. The character code processing unit 134 records information of the user-defined region as the write region, and information of the allocated hidden region, in the region management table 136. Then, the process proceeds to step S28.

Figure 12:
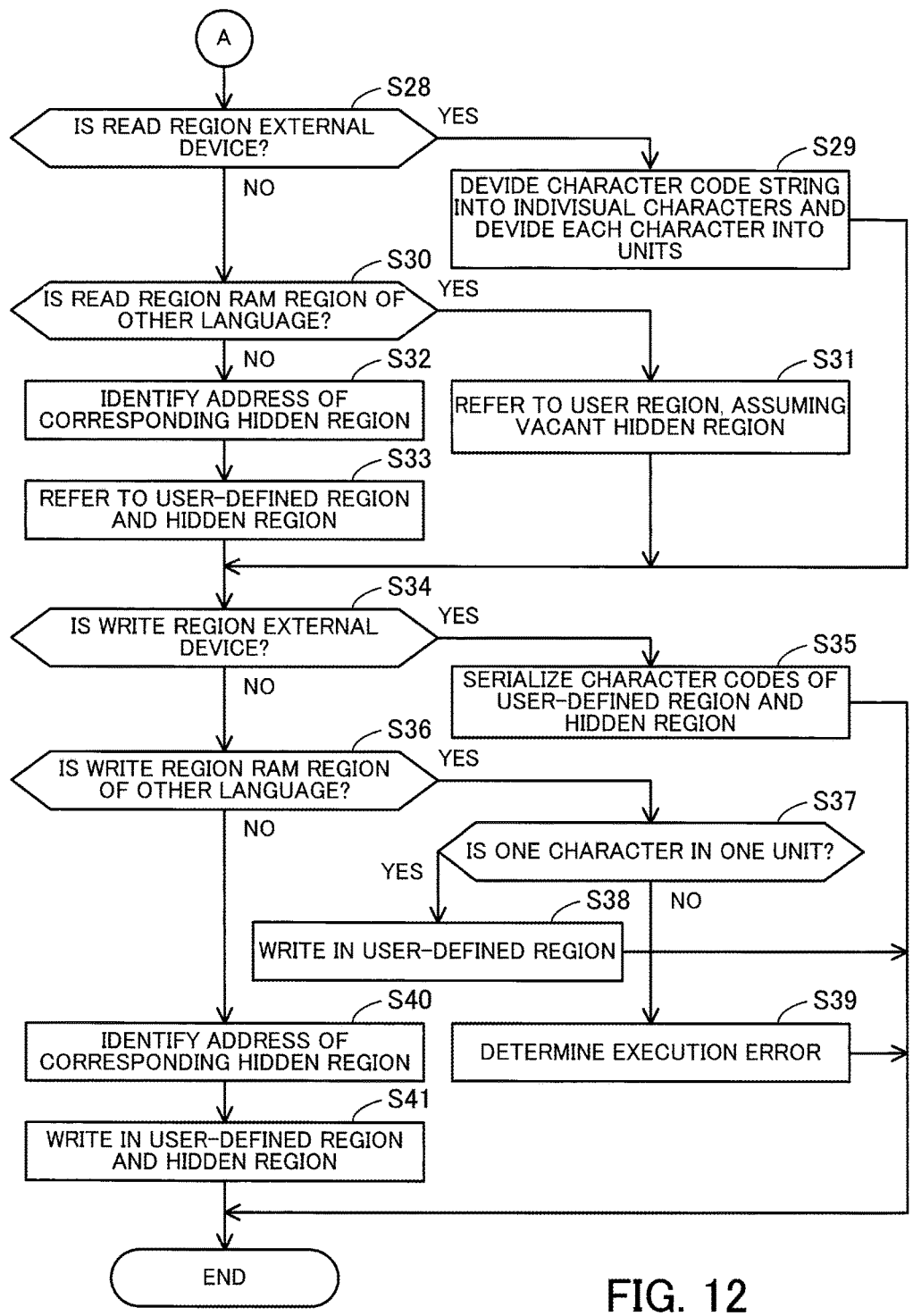
FIG. 12 is a flowchart illustrating an exemplary procedure of the character code process (continuation)

FIG. 12 is a flowchart illustrating an exemplary procedure of a character code process (continuation).

(S28) When the user program makes a request for reading a character code, the character code processing unit 134 determines whether a read region is in an external device. The external device is, for example, a device such as the HDD 103, the display 111, the terminal device 21, and the storage device 22, which are other than the CPU 101 and the RAM 102. If a read region is in an external device, the process proceeds to step S29. If not, the process proceeds to step S30.

(S29) The character code processing unit 134 reads a character code string from the external device and divides the character code string into character codes of individual characters. Further, the character code processing unit 134 divides a character code of each character into individual units. For example, when a variable-length character code that uses one to four bytes for one character is read into a character variable that uses one byte for one unit, the character code processing unit 134 divides a character code string into character codes of one to four bytes and divides each character code into one-byte units. Then, the process proceeds to step S34.

(S30) The character code processing unit 134 determines whether the read region of a character code is a region in the RAM 102 used by another language processing system. Whether or not the read region specified by the user program is the region of another language processing system is determined based on whether or not the region belongs to the region of the primary language processing system managed by the library 124. If the read region is a region of another language processing system, the process proceeds to step S31. If not, the process proceeds to step S32.

(S31) Another language processing system does not allocate a hidden region corresponding to the user-defined region. Hence, the character code processing unit 134 refers to a bit string stored in the user-defined region, assuming that a vacant hidden region is present. Then, the process proceeds to step S34.

(S32) Since the read region of a character code is a user-defined region of the primary language processing system, the character code processing unit 134 searches the region management table 136 for a hidden region corresponding to the user-defined region of the read region and identifies the address of the hidden region.

(S33) The character code processing unit 134 refers to a bit string stored in the user-defined region and a bit string stored in the hidden region which is searched for in step S32. When the read region specified by the user program is only a part of a user-defined region, the character code processing unit 134 identifies a part of a hidden region corresponding to the part of the user-defined region and refers to only the part of the hidden region. An offset from the beginning of the hidden region is calculated from the number m of units in the hidden region recorded in the region management table 136 and the number k of bytes of one unit.

For example, the number of bytes in one unit is one byte, and the number m of units per one character of a hidden region is three units, and the user program refers to the second character of a character string. In this case, the character code processing unit 134 refers to a bit string that starts from one byte after the beginning of the user-defined region and a bit string that starts from three bytes after the beginning of the hidden region.

(S34) When the user program make a request for writing a character code, the character code processing unit 134 determines whether the write region is in an external device. If the write region is in an external device, the process proceeds to step S35. If not, the process proceeds to step S36. Note that steps S34 to S41 are needless to be executed when writing of a character code is not requested (e.g. when two character codes are compared).

(S35) The character code processing unit 134 combines the bit string in the user-defined region of the read region and the bit string in the hidden region to reproduce a character code with respect to each character, and serially outputs the reproduced character code to the external device. When assuming that a vacant hidden region is present in step S31, the character code processing unit 134 practically outputs only the bit string in the user-defined region.

(S36) The character code processing unit 134 determines whether the write region of a character code is a region in the RAM 102 used by another language processing system. Whether or not the write region specified by the user program is a region of another language processing system is determined based on whether or not the region belongs to the region of the primary language processing system managed by the library 124. If the write region is a region of another language processing system, the process proceeds to step S37. If not, the process proceeds to step S40.

(S37) The character code processing unit 134 determines whether each read character code is contained in one unit. When a bit string other than a predetermined value indicating an unused state is stored in the hidden region of the read region, the character code processing unit 134 determines that one character is not in one unit. If one character is in one unit, the process proceeds to step S38. If not, the process proceeds to step S39.

(S38) In another language processing system, a hidden region corresponding to the user-defined region is not allocated. Hence, the character code processing unit 134 writes the read character code in a user-defined region prepared for another language processing system specified by the user program. For example, the character code processing unit 134 copies a bit string from the user-defined region of the read region to the user-defined region of the write region. Here, the hidden region of the read region is ignored.

(S39) The character code processing unit 134 determines an execution error. As a result, in some cases, the user program halts, and the display 111 displays "error".

(S40) Since the write region of a character code is a user-defined region of the primary language processing system, the character code processing unit 134 searches the region management table 136 for a hidden region corresponding to the user-defined region of the write region and identifies the address of the hidden region.

(S41) The character code processing unit 134 stores the bit string of the starting one unit in the character code (for example, the starting one byte of the character code) in the user-defined region of the write region, and stores the remaining bit string that overflows the user-defined region in the hidden region of the write region, with respect to each character. For example, the character code processing unit 134 copies the bit string of the user-defined region of the read region to the user-defined region of the write region, and copies the bit string of the hidden region of the read region to the hidden region of the write region. When assuming a vacant hidden region is present in step S31, the character code processing unit 134 stores a predetermined bit string indicating an unused state in the hidden region of the write region.

Next, an exemplary variant of a method of utilizing a hidden region will be described. Since the number m of units per one character in a hidden region is decided according to the maximum length of a character code, the hidden region can be vacant in most parts when using a character encoding scheme in which the length of a character code is variable, as in UTF-8. Thus, a bit string stored in a hidden region of a low use frequency may be compressed using a file compression technology.

For example, a last access time to a hidden region is recorded in the region management table 136 with respect to each hidden region. The character code processing unit 134 compresses a bit string of a hidden region for which a predetermined time or more has passed since the last access, and stores the compressed bit string in the RAM 102, and releases the original hidden region. Thereby, an in-use region of the RAM 102 is reduced. When accessing the compressed bit string, the character code processing unit 134 allocates a new hidden region in the RAM 102 and decompresses the compressed bit string in the hidden region.

Also, the library 124 of the primary language processing system, which recognizes presence of a hidden region, processes a bit string in a user-defined region and a bit string in a hidden region in association with each other. On the other hand, the server 100 might execute a program of another language processing system that does not recognize presence of a hidden region, as well as an old user program that is compiled by an old compiler and processes a character code without calling the library 124. Such programs might rewrite only a bit string of a user-defined region, ignoring presence of a hidden region. Thus, the character code processing unit 134 may detect an unintended rewrite of a user-defined region as described below.

Figure 13:
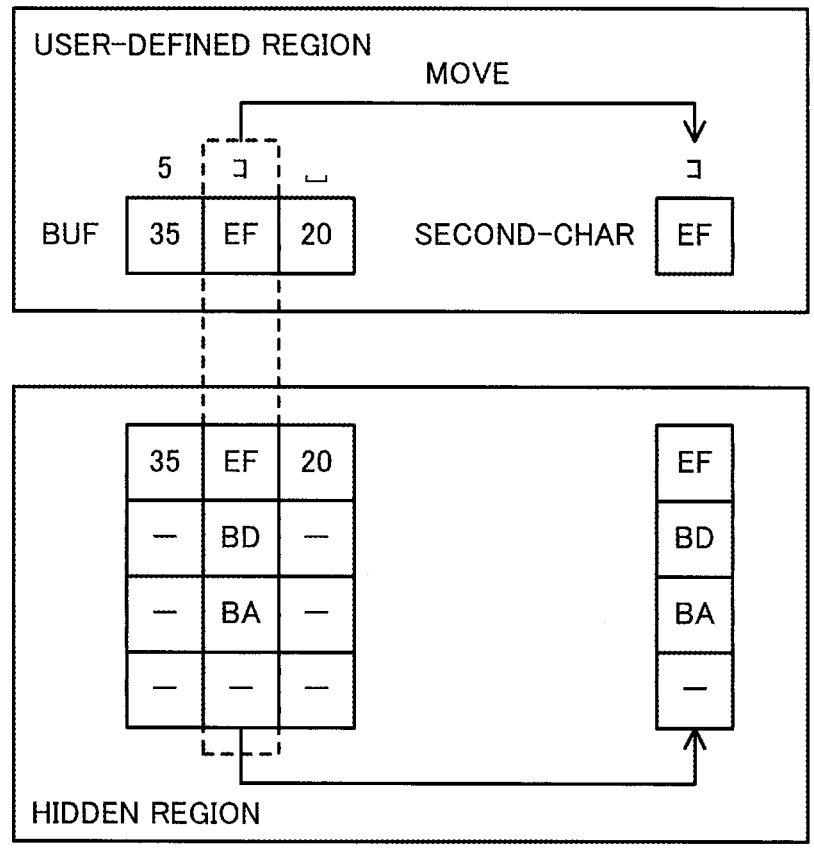
FIG. 13 illustrates another exemplary process of storing a character code by means of a hidden region.

FIG. 13 illustrates another exemplary process of storing a character code by means of a hidden region. The character code processing unit 134 allocates a hidden region of n characters multiplied by (m+1) units in the RAM 102, corresponding to a user-defined region of n characters multiplied by one unit. The m+1 units can contain a character code of the maximum length. The character code processing unit 134 stores the starting one unit of a character code in the user-defined region with respect to each character and stores the entire character code in the hidden region. When outputting a character code to an external device, the character code processing unit 134 ignores the bit string stored in the user-defined region or the bit string of the starting one unit stored in the hidden region. Note that the overlapping bit string over both of the user-defined region and the hidden region may be a bit string of a predetermined position, instead of the starting one unit of a character code.

When accessing a user-defined region, the character code processing unit 134 compares the bit string stored in the user-defined region and the bit string of the predetermined position stored in a hidden region, in order to confirm whether the both strings are identical, with respect to each character. When the both strings are not identical, the character code processing unit 134 determines that an old user program of the primary language processing system or a program of another language processing system has rewritten only the user-defined region. In that case, for example, the character code processing unit 134 determines an execution error and performs a predetermined error handling, such as halting a user program and displaying an error message on the display 111. Alternatively, the character code processing unit 134 may continue executing a user program, erasing the bit string of a hidden region (writing a predetermined bit string indicating an unused state in the hidden region). This reduces the risk of impairing compatibility for old user programs of the primary language processing system and programs of other language processing systems.

According to the information processing system of the second embodiment, a hidden region, which is not recognized from a user program, is allocated corresponding to a user-defined region allocated in the RAM 102 for a character variable of the user program. Then, when processing a character code that is longer than the number of bytes of one unit defined by the character variable, the character code is processed using both of the user-defined region and the hidden region. Thus, the user program recognizes that the character code is processed in accordance with the rule of "one unit for one character", regardless of the character encoding scheme used in read character data. Thereby, even when the character encoding scheme of the read character data is changed, user programs are needless to be modified, which enables previously created user programs to be utilized to build and operate an information processing system efficiently.

Note that, as described above, information processing of the first embodiment is performed by causing the execution control apparatus 10 to execute a program. Information processing of the second embodiment is performed by causing the server 100 to execute a program.

A program may be stored in a computer-readable storage medium (for example, the storage medium 113). Such a storage medium is, for example, a magnetic disk, an optical disc, a magneto-optical disk, and a semiconductor memory. The magnetic disk includes an FD and an HDD. The optical disc includes a CD, a CD-R(Recordable)/RW(Rewritable), a DVD, and a DVD-R/RW. A program may be stored in a portable storage medium for the purpose of distribution. In that case, a program may be duplicated or installed from a portable storage medium to another storage medium, such as an HDD (for example, the HDD 103), in order to be executed. In one aspect, modification to a program when using different character encoding schemes is reduced.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. An execution control method comprising:
  detecting, by a processor, a character process of a character variable included in a program, wherein the character variable allocates a first memory region in a memory to a character string that includes a first character and a second character following the first character, the first memory region including an area having a specific length for each character of the character string;
  allocating, by the processor, a second memory region corresponding to the first memory region to the character string when detecting the character process of the character variable; and
  processing, by the processor, a plurality of character codes that indicate the character string by using the first and second memory regions,
  wherein when a first character code indicating the first character is longer than the specific length, a part of the first character code having the specific length is stored in the first memory region, at least part of a second character code indicating the second character is stored in the first memory region by following the part of the first character code, and a remaining part of the first character code is stored in the second memory region by separating from the part of the first character code.

2. The execution control method according to claim 1, further comprising combining the part of the first character code stored in the first memory region and the remaining part of the first character code stored in the second memory region to reproduce the first character code when outputting the plurality of character codes to a device other than the memory.

3. An execution control method comprising:

detecting, by a processor, a character process of a character variable included in a program, wherein the character variable allocates a first memory region capable of storing a first character code of a specific length in a memory to each of one or more characters;

allocating, by the processor, a second memory region corresponding to the first memory region to each of the one or more characters when detecting the character process of the character variable;

processing, by the processor, a character expressed by a second character code that is longer than the specific length by using the first and second memory regions, a part of the second character code is stored in the first and second memory regions in a duplicative manner; and comparing a bit string corresponding to the part in the first memory region and a bit string corresponding to the part in the second memory region in order to detect that another program has processed the character in the character variable.

4. A non-transitory computer-readable storage medium storing an execution control program that causes a computer to perform a process comprising:

detecting a character process of a character variable included in a program, wherein the character variable allocates a first memory region in a memory to a character string that includes a first character and a second character following the first character, the first memory region including an area having a specific length for each character of the character string;

allocating a second memory region corresponding to the first memory region to the character string when detecting the character process of the character variable; and processing a plurality of character codes that indicate the character string by using the first and second memory regions, wherein when a first character code indicating the first character is longer than the specific length, a part of the first character code having the specific length is stored in the first memory region, at least part of a second character code indicating the second character is stored in the first memory region by following the part of the first character code, and a remaining part of the first character code is stored in the second memory region by separating from the part of the first character code.

5. An execution control apparatus comprising:

a memory, in which a first memory region is allocated to a character string for a character variable in a program, wherein the character string includes a first character and a second character following the first character, and wherein the first memory region includes an area having a specific length for each character of the character string; and a processor configured to perform a process including:

detecting a character process of the character variable included in the program, allocating a second memory region corresponding to the first memory region to the character string when detecting the character process of the character variable, and processing a plurality of character codes that indicate the character string by using the first and second memory regions, wherein when a first character code indicating the first character is longer than the specific length, a part of the first character code having the specific length is stored in the first memory region, at least part of a second character code indicating the second character is stored in the first memory region by following the part of the first character code, and a remaining part of the first character code is stored in the second memory region by separating from the part of the first character code.

\* \* \* \* \*